United States Patent [19]

Evans et al.

[11] Patent Number: 4,955,109
[45] Date of Patent: Sep. 11, 1990

[54] PIVOTING HORN

[75] Inventors: Alfred J. Evans; Raymond H. Misner, both of Raleigh; Dennis J. May, Pittsboro, all of N.C.

[73] Assignee: Delaware Capital Formation, Inc., Apex, N.C.

[21] Appl. No.: 410,085

[22] Filed: Sep. 20, 1989

[51] Int. Cl.5 .......................................... A22C 11/02
[52] U.S. Cl. .......................................... 17/41; 17/35; 17/38
[58] Field of Search .............. 17/41, 49, 35, 38, 33; 92/140

[56] References Cited

U.S. PATENT DOCUMENTS

| 4,021,885 | 5/1977 | Muller | 17/33 |
| 4,023,238 | 5/1977 | Phares | 17/41 |
| 4,235,157 | 11/1980 | Orloff | 92/140 |
| 4,516,387 | 5/1985 | Kupcikeuicius | 17/38 |
| 4,570,301 | 2/1986 | Beckman et al. | 17/41 |
| 4,627,138 | 12/1986 | Nausedas et al. | 17/41 |

Primary Examiner—Willis Little
Attorney, Agent, or Firm—Allegretti & Witcoff, Ltd.

[57] ABSTRACT

A stuffing horn mechanism for chub packaging machinery, utilized in association with such machinery to produce chub products by stuffing of casing with comminuted material. The stuffing horn mechanism comprises a telescoping stuffing horn, a comminuted material reservoir, and reservoir volume varying apparatus. The telescoping horn is variable in volume during telescoping, and the reservoir is in communication with the stuffing horn. The reservoir volume varying apparatus is operatively connected to the stuffing horn, for varying the volume of the reservoir in inverse relation to the volume of the stuffing horn during telescoping.

10 Claims, 5 Drawing Sheets

PIVOTING HORN

BACKGROUND OF THE INVENTION

This invention relates to chub packaging machinery, utilized to produce chub products by stuffing of casing with comminuted material, and more particularly, to a stuffing horn telescoping and pivoting mechanism.

U.S. Pat. No. 4,675,945 and allowed application Ser. No. 07/285,325 filed Dec. 13, 1988 are incorporated by reference. In apparatus as disclosed in U.S. Pat. No. 4,675,945, chub products are rapidly formed of casing, comminuted material and metal clips. The comminuted material often constitutes sausage meats, and the casing constitutes sausage casing. Metal clips sold by Tipper Tie, Inc. are the standard of the industry. Comminuted material is placed in a hopper of a pumping apparatus, and pumped. The material is pumped through a horn among the several hours of a horn turret assembly. The horn extends to a casing brake, and the horn has a casing segment shirred on its exterior. Tension of the casing is adjusted at the casing horn to provide proper advancement of both the comminuted material and casing. Stuffed casing is intermittently voided and clipped to provide ends of resulting chub products.

Figure 1:
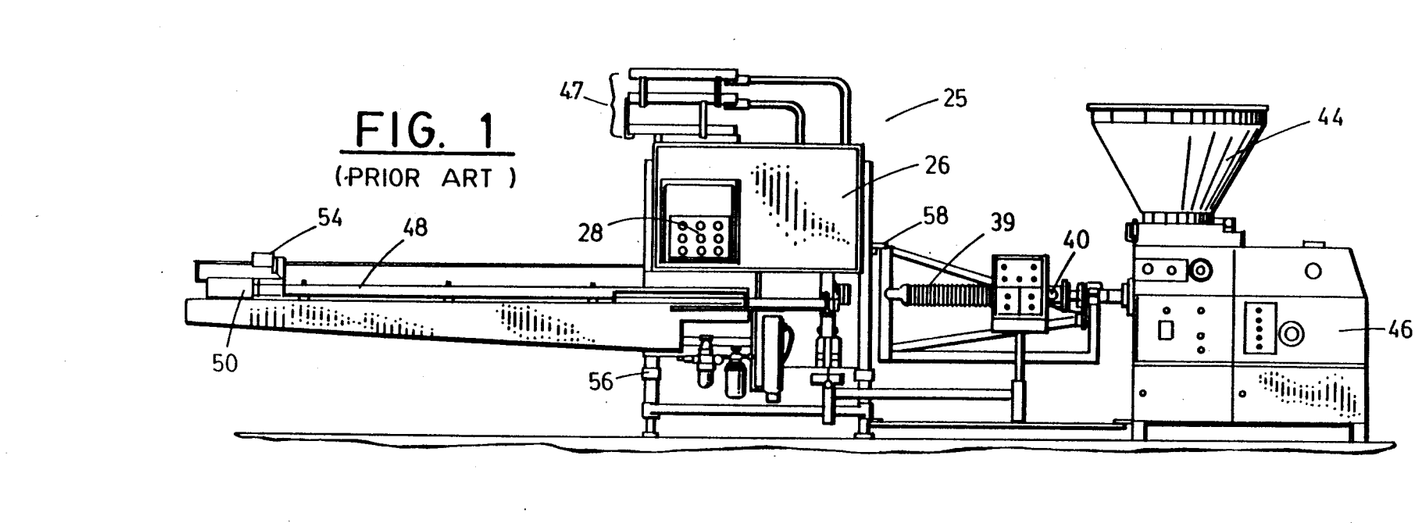
FIG. 1 is an elevation view of a chub forming apparatus, taken from U.S. Pat. No. 4,675,945.
Figure 2:
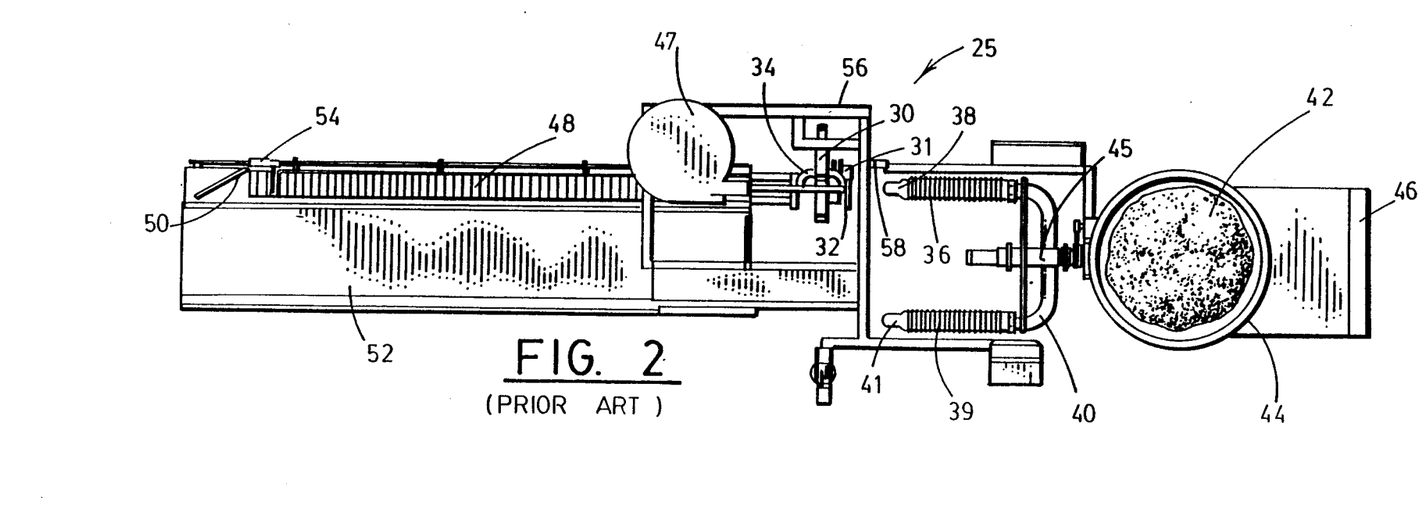
FIG. 2 is a plan view of the chub forming apparatus of FIG. 1.

Casing as used in the apparatus of U.S. Pat. No. 4,675,945 must be used in segments. Loading of such segments presents a major hurdle in increasing speed of chub forming machines. As the horn turret assembly is shown in FIGS. 1 and 2 of U.S. Pat. No. 4,675,945, which are FIGS. 1 and 2 of this specification, multiple horns are provided on a turret such that while one horn is in operative position, another horn is in service position for placement of casing thereon. Depletion of casing on the horn in operative position results in interruption of the chub forming, retraction of the horn, and pivoting of the turret to bring the serviced horn into operative position. While the stuffing horn mechanism of U.S. Pat. No. 4,675,945 and allowed application Ser. No. 07/285,325 is highly desirable for a variety of reasons, research and development has continued toward a simpler, equally rapidly acting stuffing horn mechanism.

SUMMARY OF THE INVENTION

Thus, a principal object of the present invention was a simple stuffing horn mounting and actuating mechanism.

Another principal object was ruggedness in the embodiment of the invention, for survival over the mechanical abuse to which equipment is often subjected in a meat packing environment.

Another principal object was that the mechanism prevent the introduction of significant air pockets into chub products. Casing materials such as plastics do not permit air to escape after products are sealed.

Another principal object was that the comminuted material or other stuffing material flow through the mechanism without change of direction, for applications where product characteristics do not lend themselves to changes of direction.

Another principal object was that the sequence of operations of the mechanism by an operator be simple and easily reproduced.

Another principal object was that the mechanism be self-compensating to prevent purging of the mechanism during loading of casing.

Another principal object was that the mechanism be self-aligning.

Another principal object was that the mechanism be readily and rapidly cleaned.

Another principal object was that the mechanism provide for rapid change of filling horn sizes.

Other principal objects were that the mechanism be all-mechanical, manually operated and powered, and adaptable to a variety of chub forming machines.

In a principal aspect, this invention constitutes a stuffing horn mechanim for chub packaging machinery, utilized in association with such machinery to produce chub products by stuffing of casing with comminuted material, which is an advancement of the mechanism of U.S. Pat. No. 4,675,945. The stuffing horn mechanism comprises a telescoping stuffing horn, a comminuted material reservoir, and reservoir volume varying means. The telescoping horn is variable in volume during telescoping, and the reservoir is in communication with the stuffing horn. The reservoir volume varying means is operatively connected to the stuffing horn, for varying the volume of the reservoir in inverse relation to the volume of the stuffing horn during telescoping.

As preferred, and in another principal aspect, the mechanism comprises a frame, slide guideways on the frame, a slide plate on the slide guideways, a telescoping stuffing horn, a turret mounted to the slide plate, a turret lever, a pump cylinder and piston, and a cable drive mechanism. The slide plate is mounted on the slide guideways for axial reciprocating motion. The stuffing horn defines an axial comminuted material passage, and includes an axially extending telescopic extension tube, an axially extending turret extension tube, an axially extending filling horn adapter, and an axially extending filling horn. The turret extension tube axially telescopes over the telescopic extension tube. The filling horn adapter and filling horn are connected and extend from the turret.

The turret includes a rotatable turret inner member to which the filling horn adapter is connected for rotation with the rotatable turret inner member. The telescopic extension tube is fixedly attached to the turret. The turret lever is pivotally attached to both the frame and the turret, and on manual movement, causes reciprocal sliding of the turret, filling horn, filling horn adapter, telescopic extension tube and slide plate, relative to the slide guideways and frame.

The pump cylinder extends transversely from the turret and is in communication through the turret inner member with the comminuted material passage. The pump cylinder is axially slidable with the turret. The pump piston reciprocates transversely in the pump cylinder, under action of the cable mechanism.

Piston rods are mounted to the pump piston and extend transversely from the pump piston away from the turret. A near sheave is adjacent the pump cylinder mounted for axial sliding movement with the pump cylinder, and a remote sheave is remote from the pump cylinder, mounted for axial sliding movement with the pump cylinder and near sheave. A cable extends about the sheaves. From the sheaves, the cable extends axially to fixed attachments to the frame. A cable clamp clamps the cable to the piston rods, such that sliding movement of the turret, filling horn, filling horn adapter, telescopic extension tube and slide plate causes, through the cable, transverse motion of the piston rods and pump piston.

Thus, axial extension of the stuffing horn causes advancement of the pump piston to the turret, and axial retraction of the stuffing horn causes retraction of the pump piston. Also, pivoting of the turret lever causes telescoping of the stuffing horn, and pivoting of the filling tube about the turret causes pivoting of the filling tube, filling tube adapter and turret inner member. The stuffing horn mechanism permits retraction and pivoting of the filling tube, for placement of casing segments on the filling tube, and simultaneous accommodation of the comminuted material, displaced from the stuffing horn during retraction, in the reservoir. Return of the filling tube to axial alignment and advancement simultaneously causes return of the comminuted material from the reservoir into the stuffing horn. Replacement of casing on the filling tube is accomplished without significant air inclusions in the comminuted material, rapidly and automatically.

These and other aspects, objects and advantages of the invention will be more clearly understood by a reading of a detailed description of the preferred embodiment of the invention, which follows a brief description of the drawing.

BRIEF DESCRIPTION OF THE DRAWING

In the accompanying drawing, the figures of the drawing are briefly described as follows.

DETAILED DESCRIPTION OF THE PREFERRED EMBODIMENT

Referring to FIGS. 1 and 2, an apparatus or machine 25 includes a control panel 26 with controls 28 and internal electronic and pneumatic circuitry alongside a clipper 30, a looper 31, a casing brake 32, and a voider assembly 34. The casing brake 32 defines the stuffing and casing intake to the machine 25. Casing 36 enters from a horn 38, which is one of several horns on a horn support structure 40. Stuffing 42 enters from the hopper 44 of a pumping apparatus 46, through the horn 38. While the horn 38 is in operative alignment with the casing brake 32, the horn 41 is in service position for placement of additional casing 39 on the horn 41. With reference to an axial direction across FIGS. 1 and 2, horns 38, 41 are transversely rotatable about an axially extending turret 45, for sequential movement to and from the operative and service positions. The horns are also axially advanceable and retractable, without telescoping, to and from an advanced, operative position.

Clips are stored for use in clip trays 47. A power conveyor 48 moves chub products away, to a diverter 50, to be diverted to a sloped product discharge tray 52 for manual removal. A movable product recognition paddle 54 trips upon product contact, to initiate product cut-off and clipping.

All the foregoing components are supported on a frame 56. The horn support structure 40 is pivotally mounted to the frame 56 at pivot 58, to be swung away from the apparatus 25, for servicing of the casing brake 32, clipper 30 and looper 31, and away from the apparatus 46 for servicing thereof. The turret 45 is releasably connected to the pumping apparatus 46.

Figure 3:
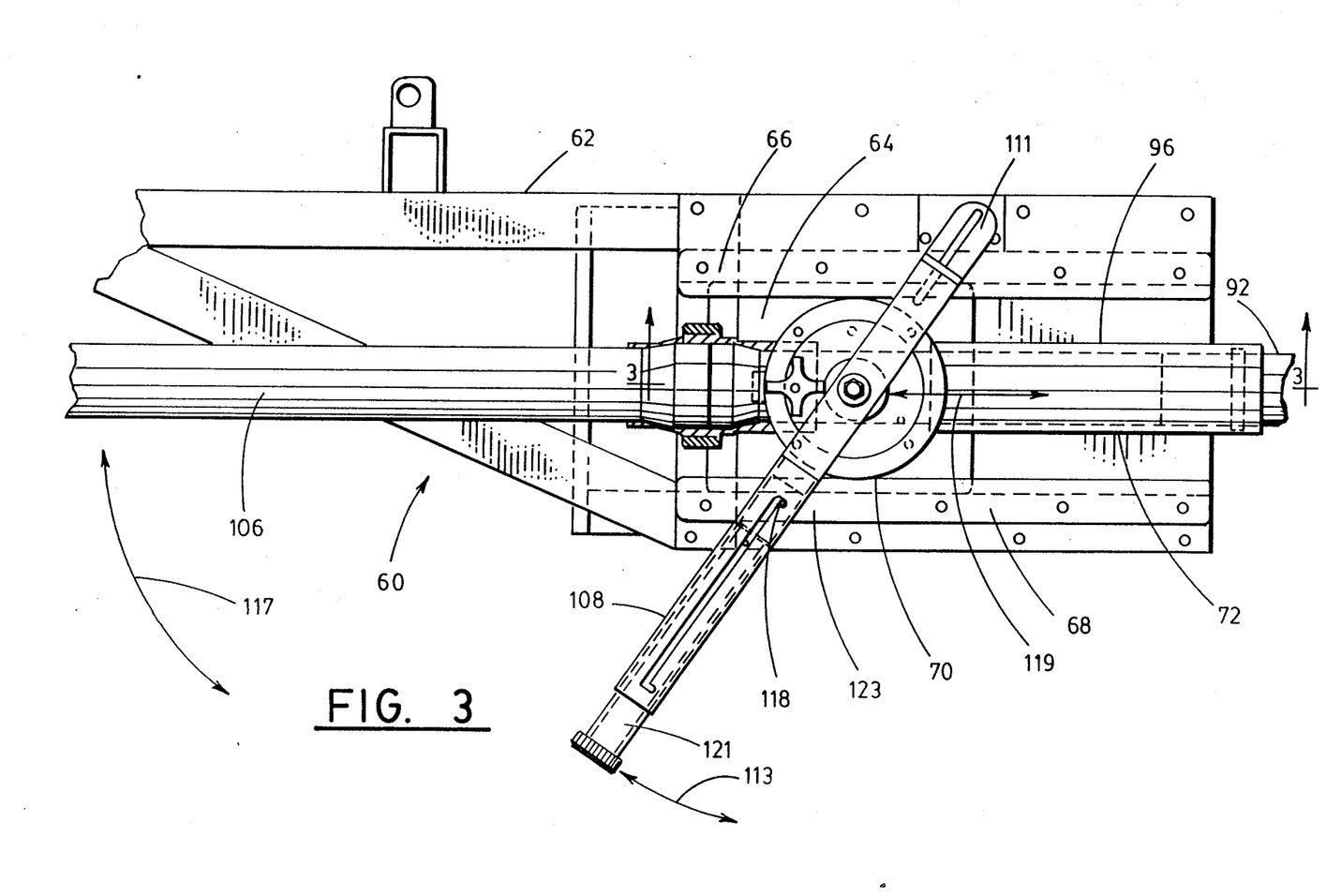
FIG. 3 is a partial plan view of the stuffing horn mechanism of the present invention, used in replacement of the stuffing horn mechanism of U.S. Pat. No. 4,675,945.
Figure 4:
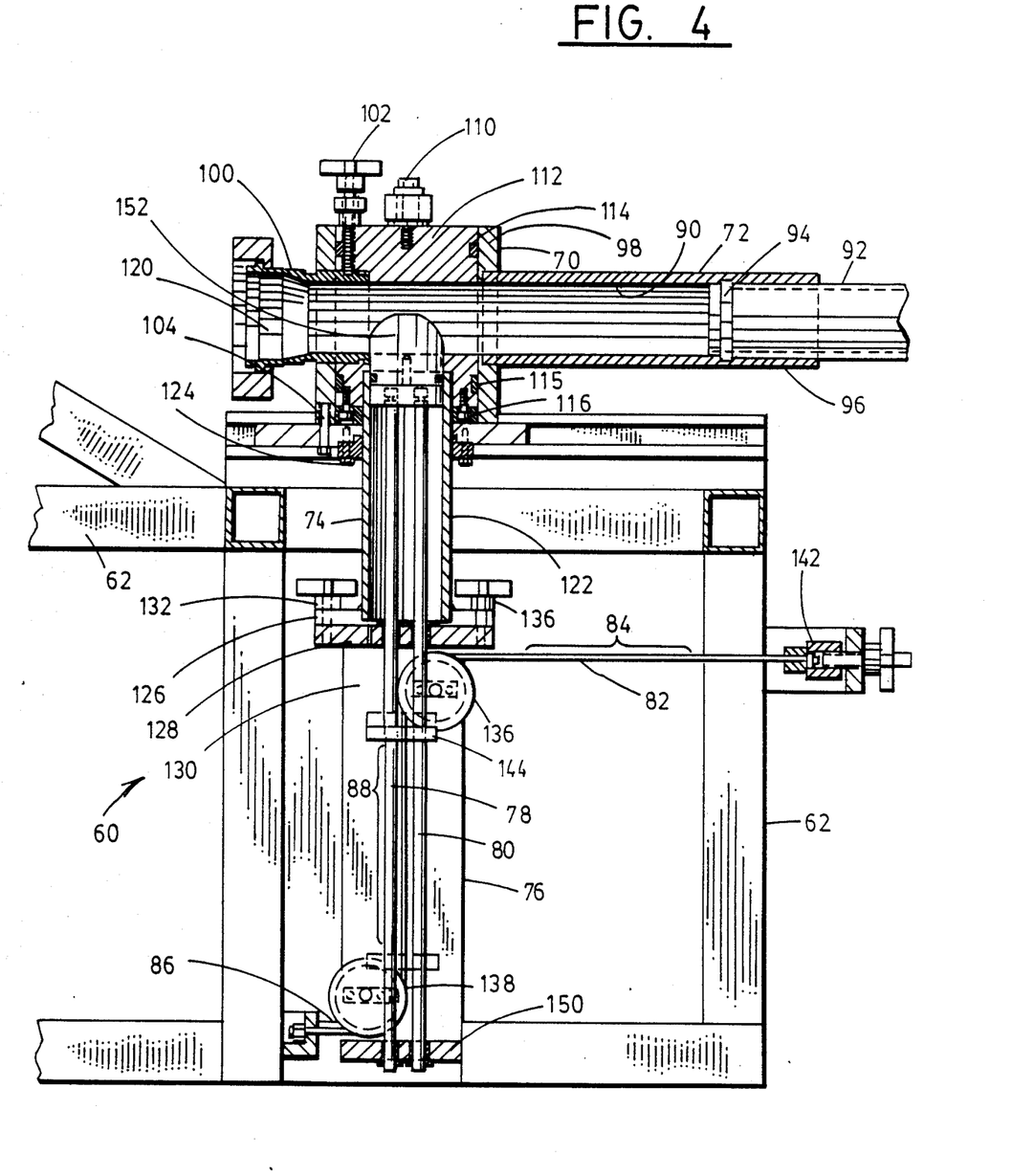
FIG. 4 is a cross-section view of the stuffing horn mechanism of FIG. 3, taken along line 4—4 in FIG. 3.

Referring now to FIGS. 3 and 4, the preferred embodiment of the present invention is one possible embodiment of the invention. The preferred embodiment constitutes a stuffing horn mechanism 60 including a tubular welded frame 62 attachable for horizontal pivoting about the pivot 58 to a machine such as machine 25, in replacement of horns 38, 41, turret 45, structure 40 and associated elements.

Figure 5:
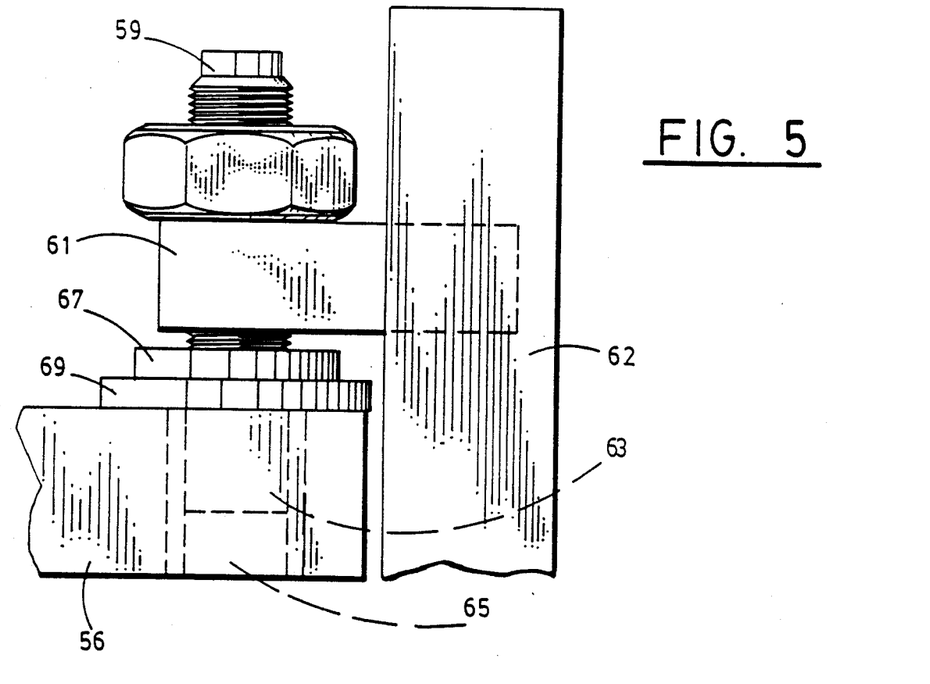
FIG. 5 is a detail, elevation view of the pin mounting of the frame of the preferred embodiment to the frame 56 of the clipper apparatus 25 of U.S. Pat. No. 4,675,945.
Figure 6:
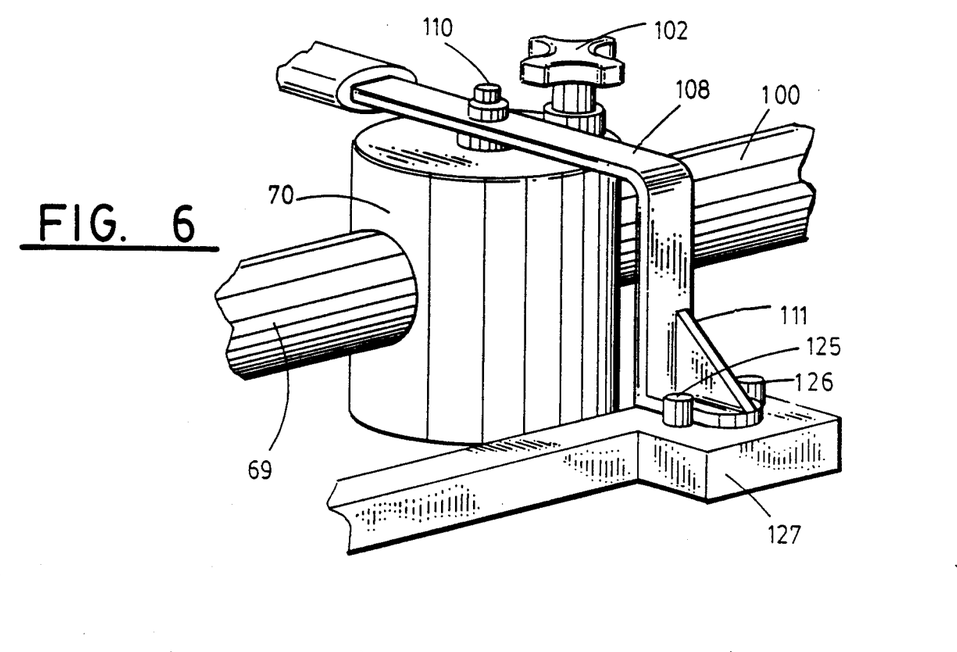
FIG. 6 is a partial perspective view, generally from the opposite side of FIG. 4, of the mannual lever of the preferred embodiment and pivotal mounting thereof in relation to the frame.

The pivot 58 is uniquely provided in the mechanism 60 by a threaded pin 59, shown in FIG. 5. The pin 59 is threaded in a bracket 61 on the frame 60, and a nonthreaded portion 63 extends into a bushing 65 of a frame member of the frame 56 of the stuffing machine 25. A fixed pin ring 67 of the pin rests on a bronze bearing 69 on the frame 56. The pint 59 provides vertical alignment of the mechanism 60 with the machine 25 by adjustment of the height of the bracket 61 and frame 62 above the frame member of the frame 56.

Atop the frame 62, a slide plate 64 is mounted on slide guideways 66, 68. A turret assembly 70 is atop the slide plate 64, and a telescoping stuffing horn assembly 72 is mounted to the turret assembly 70. A pump assembly 74 extends below the turret assembly 70, and a pump drive assembly 76 extends below the pump assembly 74.

The horn assembly 72 includes several aligned components. The components extend longitudinally in a direction left to right in FIG. 3, defined as the axial direction. The slide plate 64 is mounted between the slide guideways 66, 68 for axial reciprocating motion. The turret assembly 70 extends about a vertical transverse axis of rotation, and the pump assembly 74 extends along the same vertical, transverse axis of rotation. The pump drive assembly 76 includes downwardly, transversely extending pump piston rods or pins 78, 80 and a cable 82 which extends both axially as at 84, 86 and transversely as at 88.

The telescoping stuffing horn assembly 72 defines an axially extending comminuted material passage as marked at 90 throughout its length. From right to left in FIG. 3, the assembly 72 first includes an axially extending telescopic extension tube 92. Remote from the turret assembly 70, the telescopic extension tube 92 has a retaining collar (not shown) which secures a coupling nut (not shown) for coupling of the tube 92 to the output tube of the pumping apparatus 46. An elastomeric gland (not shown) over the retaining collar compensates for slight misalignment of the tube 92 and pump output tube. The gland provides stress relief at the coupling and an airtight seal. Opposite its secured outer end, the tube 92 is encircled by a U-cap seal 94, and extends within a turret extension tube 96. The seal 94 is located in a groove of the turret extension tube 96, and provides airtight connection of the tube 92 and tube 96.

The turret extension tube 96 extends from an end remote the turret which is slidably sealed over the telescopic extension tube 92 toward the turret to attachment to the outer barrel 98 of the turret assembly 70. The turret barrel 98 is tubular, with porting to the turret extension tube and opposite thereto, porting to a filling horn adapter 100. Within the turret barrel 98, a cylindrical turret inner body 112 rotates, with a comminuted material passage extending through the turret inner body. Upper and lower wear rings 114, 115, 116 support the turret 112 during rotation of the turret 112. The turret extension tube 96 is fixedly mounted to the turret barrel 98 as by welding; as shown in FIG. 4, the filling horn adapter 100 is releasably mounted to the barrel 98 by an adapter locking assembly 102, for adaption to filling horns of differing sizes by interchange of the adapter 100 with other adapters. A filling horn 106 to which adapter 100 is sized is shown in FIG. 3 only, extending axially from the adapter 100. As shown, the horn members 92, 96, 100, 106 extend coaxially. The comminuted material passage 90 extends completely through the horn members 92, 96, 100, 106 and turret inner member 112.

The turret barrel 98 is bolted to the slide plate 64 via bolts such as bolt 104. Sliding of the slide plate 64 causes sliding of the turret barrel 98 and turret assembly 70, and thereby, sliding movement of the filling horn adapter 100, filling horn 106, and turret extension tube 96. The turret extension tube 96 slides within the telescopic extension tube 92. Referring to FIG. 3 (FIG. 3 only), a turret lever 108 provides for manual driving of the sliding motion of the slide plate 64.

The turret lever 108 is pinned for pivoting motion atop the turret inner member 112, and more specifically pinned via a lever pivot assembly 110 (FIGS 4 and 5). The turret lever 108 is also restricted in its motion relative to the frame at heel 111 by two spaced, standing pins 125, 126. The pins 125, 126 are fixed in a wear block 127 on the frame 62. The lever heel 111 of the lever 108 extends between the pins but is not attached to the pins 125, 126, wear block 127 or frame 62. The pins restrict the lever heel 111 to a motion which combines pivoting and transverse translation. The frame is immobile when fixed in place to the stuffing apparatus 25 and pump apparatus 46; thus, mannual force applied to the turret lever 108 causes pivoting of the turret lever 108 about the lever heel 111 in the direction of arrow 113. Under action of the lever 108, the turret assembly 70 and associated slidable horn elements slide along the slide guideways 66, 68 in the direction of arrow 119. As the transverse distance between the lever pivot assembly 110 and pins 125, 126 decreases, the heel 111 is free to extend transversely as necessary. Through application of moderate manual force to the turret lever 108, the filling horn 106 is advanced toward the stuffing apparatus 25, into operative position with the casing brake 32, and retracted away from the stuffing apparatus 25.

While retracted, the filling horn 106 may be pivoted in the direction of arrow 117 from axial alignment as shown, by light manual force applied to the filling horn 106. Application of such force pivots the filling horn 106, filling horn adapter 100 and turret inner member 112. The porting of the turret barrel 98 through which the filling horn adapter 100 extends is enlarged horizontally to allow horizontal pivoting of the adapter 100. An O-ring seal is provided between the adapter 100 and turret inner member 112. An O-ring seal is also provided in a dovetail groove in the turret inner member 112 about the opening along the comminuted material passage adjacent the turret extension tube 96. The groove is dovetailed to prevent extrusion of the O-ring seal from the groove as the turret inner body 112 rotates.

The turret lever 108 itself is telescopic, for purpose of alternately maximizing leverage during pivoting, and minimizing the obstruction of the lever during servicing of the mechanism 60. An outer lever member 121 telescopes within an inner lever member 123. A detent mechanism including a detent pin 118 on member 121 and a dual detent slot on member 123 releasably locks the outer member 121 at the extremes of its inward and outward extension.

In the base of the turret inner member 112, as shown in FIG. 4, a socket 120 extends into open communication with the comminuted material passage of the horn and turret assemblies 72, 70. The socket 120 is centered on the axis of rotation of the turret inner member 112. A pump cylinder 122 is fitted to the socket 120, and extends below the turret assembly 70. Near its proximal end, the cylinder 122 has mounted thereon a pump mounting ring 124. The mounting ring 124 is bolted to the slide plate 64, and the cylinder 122 is welded to the mounting ring 124. Thus, the cylinder 122 travels with the slide plate 64. At its distal end, the cylinder 122 has mounted thereon, as by welding, a cylinder flange 126. A drive mounting flange 128 supports a drive assembly flange 130, and is itself supported below the cylinder flange 126. The drive mounting flange 128 is supported below and against the cylinder flange 126 by screw threaded fasteners 132, 134 which include hand-operated knobs. Because the drive mounting flange 128 is fastened to the cylinder flange 126 and thereby to the cylinder 122, the flanges and drive assembly frame 130 travel with the slide plate 64.

A pair of pulley elements such as sheaves 136, 138 are mounted on the drive assembly frame 130. The sheaves are mounted for rotation about transverse, horizontal axes of rotation. The sheaves include a near or proximal sheave 136, and a remote or distal sheave 138. Except to the extent they travel as the slide plate 64 travels, the sheaves 136, 138 are fixed: they do not travel transversely toward or away from the turret and horn assemblies 70, 72.

The cable 82 extends about the sheaves 136, 138, therebetween, and extends in both axial directions away from the sheaves 136, 138 to attachment to the frame 62 of the stuffing horn mechanism 60. Attachment adjacent the distal sheave 138 is releasable. Attachment at the opposite end of the cable 82 is to a cable tensioning mechanism 142, and also releasable.

Figures 7, 8:
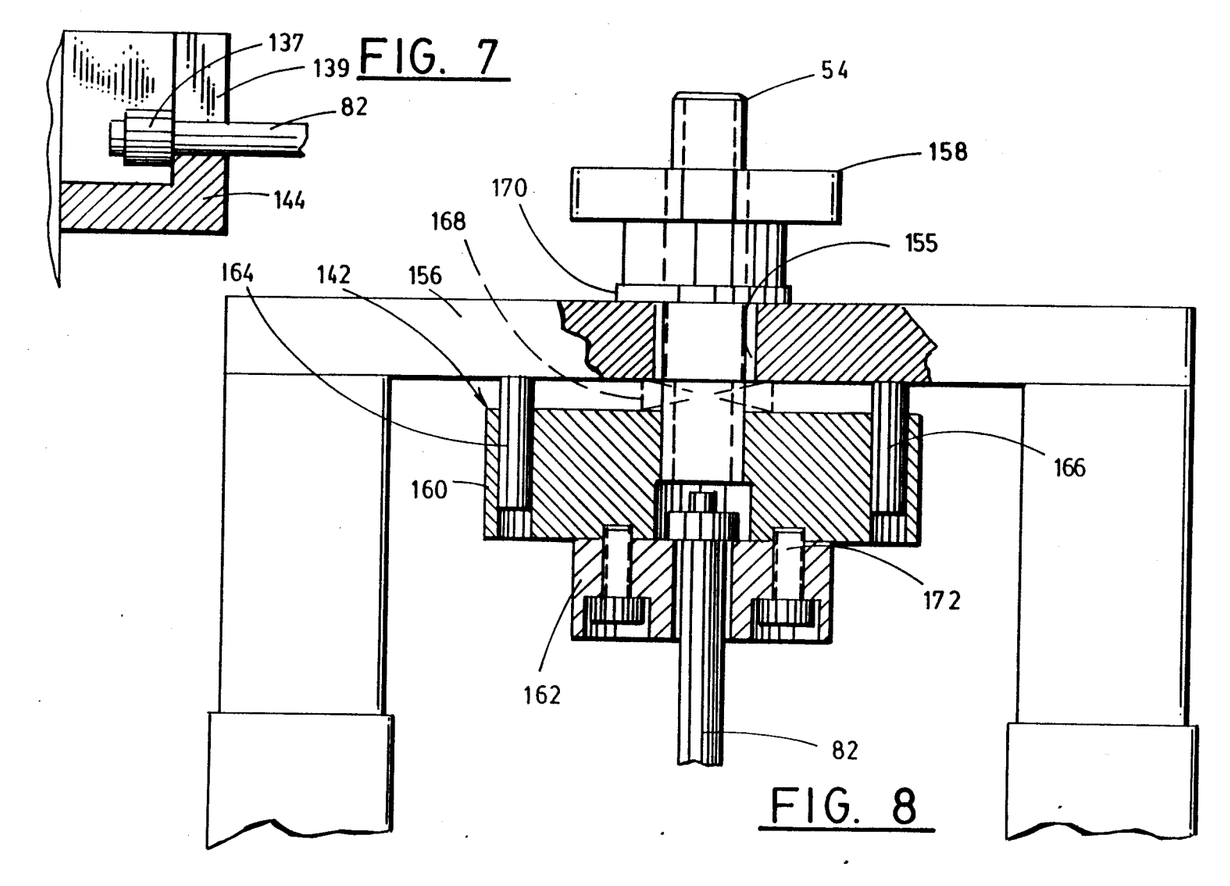
FIG. 7 is a detail elevation view of the attachment of a cable end to the frame of the apparatus.
FIG. 8 is a detail plan view of a cable tensioning mechanism.

Referring to FIG. 7, a fitting 137 swedged on the cable end slides into a slot 139 of a cable retaining block, for quick disconnection. Referring to FIG. 8, the cable tensioning mechanism 142 includes a draw rod 154 passed through a clearance opening 155 in a fixed frame member 156. The draw rod 154 is externally threaded and an internally threaded knob 158 is mounted by cooperation of screw threads thereon. A tension block 160 has a cable retaining block 162 bolted to the block 160, and is slidably mounted on pins 164, 166 welded to the frame member 156. A helical spring 168 interposes the frame member 156 and the tension block 160. A friction washer 170 interposes the knob 158 and frame member 156. Turning of the knob 158 tensions the cable 82, which is held to the cable retaining block 162 by a swedged fitting 172.

As the sheaves 136, 138 travel axially, under action of the slide plate 64, the portion of the cable which extends transversely varies. As the proximal sheave 136 travels toward the pumping apparatus 46, to the right in FIG. 4, the portion of the cable which is axially adjacent the sheave 136 moves about the sheave 136, and then extends transversely. As the distal sheave 138 simultaneously moves, the portion of the cable transversely adjacent the distal sheave 138 moves about the sheave 138 and then extends axially. Reverse motion causes reverse action.

Transversely adjacent and below the proximal sheave 136, a cable clamp block 144 clamps the cable and a pair of piston rods or actuator pins 78, 80 to each other. The actuator pins 78, 80 extend through bushings on the cylinder and drive mounting flanges 126, 128 and through bushings on a base plate 150 on the drive assembly frame 130. The actuator pins 78, 80 extend into the pump cylinder 122, to attachment to a pump piston 152. Transverse motion of the cable between the sheaves 136, 138 causes transverse motion of the actuator pins 78, 80, and transverse motion of the pump piston 152. Thus, sliding of the slide plate 64 toward the pumping apparatus 46, to the right in FIGS. 3 and 4, causes retraction of the pump piston 152 transversely, and downward, toward the base of the pump cylinder 122. Sliding of the slide plate toward the stuffing apparatus 25, to the left in FIGS. 3 and 4, causes advancement of the pump piston 152 transversely, and upward, toward the top of the pump cylinder 122.

While the horn mechanism 60 is in operation with comminuted material inside the horn assembly 72, retraction of the filling horn 106 may be desired, to place casing on the filling horn 106. At such times, with the mechanism 60, the pumping apparatus 46 is interrupted, and manual retraction of the filling horn through use of the turrent lever 108 may begin immediately. If desired, a limit switch and associated clamp on casing on the horn 106 may cause automatic recognition of the end of loaded casing and interrupt operation of both apparatus 25 and apparatus 46. Also, unintended sliding of the slide plate 64 may be prevented by a rod releasably fastened between the slide plate 64 and frame 62 which prohibits motion.

Sliding of the slide plate 64 under action of the lever 108 causes manual retraction of the filling horn 106, and also through cable movement of cable 82, causes retraction of the pump piston 152. Retraction of the pump piston 152 creates a low pressure area above the pump piston 152 in the comminuted material passage 90. Atmospheric pressure from outside the filling horn 106 forces comminuted material in the filling horn 106 into the pump cylinder 122 above the piston 152. As the piston 152 retracts, the pump cylinder 122 fills with comminuted material. Air below the piston 152 within the pump cylinder 122 is vented. Comminuted material is not lost, but retained in the cylinder, which is a reservoir for such material. Afte loading of casing, as the filling horn 106 is then advanced, the piston 152 advances, forcing the comminuted material from the pump cylinder 122 into the filling horn 106, filling the horn 106, for speedy return to operation with the stuffing apparatus 25.

The preferred embodiment of the invention, and the invention itself, are now described in such full, clear, concise and exact detail as to enable a person of ordinary skill in the art to make and use the invention. A variety of variations beginning from the preferred embodiment are possible without departing from the scope of the invention. As a result, the following claims conclude this specification, to particularly point out and distinctly claim the subject matter regarded as invention.

What is claimed is:

1. For chub packaging machinery, utilized to produce chub products by stuffing of casing with comminuted material, a stuffing horn mechanism comprising:
   a telescoping stuffing horn, the horn being variable in volume during telescoping;
   a comminuted material reservoir in communication with the stuffing horn; and
   means operatively connected to the stuffing horn, for varying the volume of the reservoir in inverse relation to the volume of the stuffing horn during telescoping.

2. A stuffing horn mechanism as in claim 1, the horn including a telescopically movable segment and reservoir volume varying means including,
   piston means in the reservoir; and
   piston driving means mechanically connected to the stuffing horn telescopically movable segment, for driving the piston in response to telescopic motion of the stuffing horn telescopically movable segment.

3. A stuffing horn mechanism as in claim 2, further comprising,
   a frame supporting the mechanism;
   slide means on the frame, the telescopically movable segment on the slide means, for sliding the telescopically movable segment relative to the frame; and
   the piston driving means mechanically connected to the slide means, for transmitting motion of the slide means to the piston for the driving of the piston.

4. A stuffing horn mechanism as in claim 3, the slide means including slide guideways on the frame and a slide guided member on the slide guideways;
   the piston driving means including cable means mechanically connected to the slide guided member and the piston means.

5. A stuffing horn mechanism as in claim 4, the telescoping stuffing horn extending and moving axially;
   the reservoir extending transversely to the stuffing horn, and the piston moving transversely;
   the cable means including a cable and a cable pulley means;
   the cable pulley means attached for movement with the slide guided member; and
   the cable extending axially from attachment to the frame to the cable pulley means, about the cable pulley means and transversely to attachment to the piston.

6. A stuffing horn mechanism as in claim 5 further comprising means mounted to the cable for tensioning the cable.

7. A stuffing horn mechanism as in claim 5, the piston driving means including a piston rod attached to the piston extending transversely; and
   the cable clamped to the piston rod.

8. A stuffing horn mechanism as in claim 7, the cable means including a second cable pulley means, attached for movement with the slide guided member transversely spaced from the first cable pulley means; and
   the cable extending to the second cable pulley means about the second cable pulley means, and axially from the second cable pulley means to attachment to the frame.

9. A stuffing horn mechanism as in claim 1 further comprising a turret, the stuffing horn pivotally mounted to the turret for pivoting as well as telescoping movement.

10. For chub packaging machinery, utilized to produce chub products by stuffing of casing with comminuted material, a stuffing horn mechanism comprising:
a frame;
slide guideways on the frame;
a slide plate mounted on the slide guideways for axial reciprocating motion;
a telescoping stuffing horn defining an axial comminuted material passage, including an axially extending telescopic extension tube;
the telescopic extension tube;
an axially extending filling horn adapter; and
an axially extending filling horn connected to the filling horn adapter;
a turret mounted to the slide plate including a rotatable turret inner member, the filling horn adapter attached to the turret inner member for rotation therewith, and the telescopic extension tube fixedly attached to the turret;
a turret lever pivotally attached to the frame and pivotally attached to the turret for reciprocal sliding of the turret, filling horn, filling horn adapter, telescopic extension tube and slide plate relative to the frame;
a pump cylinder extending transversely from the turret and in communication through the inner member with the comminuted material passage, the pump cylinder axially slidable with the turret;
a pump piston in the pump cylinder for transverse, reciprocal motion;
piston rods mounted to the pump piston extending transversely from the pump piston away from the turret;
a near sheave adjacent the pump cylinder mounted for axial sliding movement with the pump cylinder;
a remote sheave remote from the pump cylinder mounted for axial sliding movement with the pump cylinder and near sheave;
a cable extending from fixed attachment to the frame axially to the near sheave, about the near sheave, transversely to the remote sheave, about the remote sheave, and axially to fixed attachment to the frame; and
a cable clamp clamping the cable to the piston rods;
sliding movement of the turret, filling horn, filling horn adapter, telescopic extension tube and slide plate causing, through the cable, transverse motion of the piston rods and pump piston;
whereby axial extension of the stuffing horn causes advancement of the pump piston to the turret and axial retration of the stuffing horn causes retraction of the pump piston.

* * * * *